United States Patent
Heflinger et al.

(12)
(10) Patent No.: US 6,396,605 B1
(45) Date of Patent: May 28, 2002

(54) APPARATUS AND METHOD FOR TUNING AN OPTICAL INTERFEROMETER

(75) Inventors: Donald G. Heflinger, Torrance; Jeffrey S. Bauch, Redondo Beach; Todd E. Humes, Thousand Oaks, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/236,981

(22) Filed: Jan. 26, 1999

(51) Int. Cl.$^7$ .......................... H04B 10/00; H04B 10/12
(52) U.S. Cl. .................. 359/154; 359/173; 359/161
(58) Field of Search ............................... 359/161, 173, 359/189, 195, 332, 333, 334, 335, 336; 341/137

(56) References Cited

U.S. PATENT DOCUMENTS

| | | | |
|---|---|---|---|
| 5,978,129 A | * 11/1999 | Jourdan et al. | 359/326 |
| 6,069,534 A | * 5/2000 | Kobayashi | 330/308 |
| 6,175,320 B1 | * 1/2001 | Heflinger | 341/137 |
| 6,246,500 B1 | * 6/2001 | Ackerman | 359/161 |
| 6,252,692 B1 | * 6/2001 | Roberts | 359/173 |

OTHER PUBLICATIONS

Eric A. Swanson, Jeffrey C. Livas, and Roy S. Bondurant "High Sensitivity Optically Preampflied Direct Detection DPSK Receiver With Active Delay–Line Stabilization", IEEE Photonics Technology Letters, vol. 6, No. 2, Feb. 1994, pp. 263–265.

* cited by examiner

Primary Examiner—Leslie Pascal
Assistant Examiner—Dalzid Singh
(74) Attorney, Agent, or Firm—Robert W. Keller (57) ABSTRACT

An apparatus using an optical signal for actively tuning an optical interferometer without introducing any dither in its optical path length. The apparatus comprises a dither generator, means applying a portion of the dithering signal to the optical signal so as to provide an optical signal having a varying wavelength, an optical interferometer having a path length that is tunable and that responds to the optical signal having a varying wavelength and a path length adjustment drive signal and develops a first interference pattern when said path length is a prescribed value and a second interference pattern when the optical path length is changed, photodetector means responsive to the optical interference pattern and operative to develop an electronic feedback signal when the first interference pattern is not present, and a synchronous detection lock-in amplifier that is responsive to a portion of the dithering signal and the electronic feedback signal and operative to produce the optical path length adjustment drive signal. The drive signal changes the optical path length until it reaches the prescribed value, thereby producing the first interference pattern and tuning the optical interferometer. also a method of using an optical signal for tuning an optical interferometer by adjusting its optical path length without introducing dither into the path length is invented.

14 Claims, 2 Drawing Sheets

APPARATUS AND METHOD FOR TUNING AN OPTICAL INTERFEROMETER

This invention was made with Government support. The Government has certain rights in this invention as specified in FAR 52.227-12.

BACKGROUND OF THE INVENTION

1. Field of the Invention

The present invention relates to optical communication systems, and more particularly to an apparatus and method for tuning an optical interferometer.

2. Description of the Prior Art

Optical interferometers made using optical fiber or silica waveguide are not stable devices. They are particularly susceptible to temperature variations. As the temperature proximate the optical interferometer changes, the path length of the optical fibers or silica waveguide making up its legs likewise change. This results in a change in the interference pattern created by the optical interferometer. To compensate, the optical interferometer must be tuned continuously.

An apparatus and method for tuning an optical interferometer is known in the art. An example of such an apparatus is described in an article by Eric A. Swanson, Jeffrey C. Livas and Roy S. Bondurant, entitled "High Sensitivity Optically Preamplified Direct Detection DPSK Receiver With Active Delay-Line Stabilization," in IEEE Photonics Technology Letters, Vol. 6, No. 2, February 1994. This article describes an optical communication system that modulates digital information onto transmitted light using differential phase shift keying (DPSK) and then demodulates this information using an actively tuned unbalanced Mach-Zehnder optical interferometer that is tuned using an apparatus and a method known in the art. The unbalanced Mach-Zehnder optical interferometer has an additional optical path length in one leg that provides a propagation delay duration of one data bit. The imbalance in the Mach-Zehnder optical interferometer enables light in one data bit to be optically interfered with light in the data bit immediately following this data bit. The relative state of optical phase between these two DPSK data bits determines in which of the two output legs of the interferometer light is produced provided that the unbalanced Mach-Zehnder optical interferometer is properly tuned within a fraction of a wavelength of the light. Light produced from one leg constitutes digital "ones" while light produced in the other leg constitutes digital "zeros" in the transmitted digital information signal. This article also describes an apparatus and a method for using optical amplification to improve receiver sensitivity that utilizes a doped optical fiber amplifier to boost the signal level and a Fabry-Perot narrow band filter to remove the out-of-band amplified spontaneous emission (ASE) introduced by the fiber amplifier.

The apparatus described in the article includes a laser and a phase modulator for producing an optical DPSK signal at a preselected wavelength, a 10 GHz tunable fiber Fabry-Perot filter and an automatic controller for dithering the pass band wavelength of the filter so as to keep the peak of the filter at the optical signal wavelength, a tunable unbalanced Mach-Zehnder optical interferometer, a dual balanced detector and a feedback electronic circuit coupling the signal developed across one detector of the balanced detector to one leg of the Mach-Zehnder interferometer.

The article describes two different approaches to provide tuning of the optical path length in the unbalanced Mach-Zehnder optical interferometer. In the first approach, the interferometer is made of optical fiber and one leg of the interferometer is wrapped around a piezoelectric transducer (PZT) that enables an electronic signal to stretch the fiber, thereby increasing the optical path length. In the second approach, the interferometer is made of a silica integrated optical waveguide with an integral thermal heater that enables an electronic signal to increase the temperature of one leg of the interferometer, thereby increasing the optical path length.

The known art for tuning the Mach-Zehnder presented in this article uses a small electronic dither signal applied to the actively tuned optical path length to provide a feedback signal for the electronic controller enabling proper adjustment of the optical path length. Electronic synchronous detection techniques on this dither signal are used to provide the appropriate corrections to the optical path length, enabling the error in tuning to be below an acceptable level.

The prior art approaches for actively tuning an optical interferometer have several disadvantages. First, they introduce an undesired optical intensity dither on top of the original optical communication signal that is intended to be extracted. This dither arising from the intentional dither of the optical path length is actually a source of noise that degrades the fidelity of the original communications signal. Second, the approach using the heater to perform the dither and tuning is restricted to relatively low frequencies of dither due to the relatively large thermal time constant of the heater.

Third, the approaches introduce a small dithering variation in the interference state delivered at the output of the Mach-Zehnder interferometer. This precludes the use of the interferometer in applications where an absolute quiet state of interference must be maintained.

What is needed, therefore, is an apparatus for actively tuning an optical interferometer that allows the interferometer to be quietly maintained at a relatively constant optical path length.

In addition, it is desirable to actively tune the optical interferometer without introducing any dither in its optical path length and accommodate effects of changes in temperature or wavelength.

SUMMARY OF THE INVENTION

The preceding and other shortcomings of the prior art are addressed and overcome by the present invention which provide generally, in a first aspect, an apparatus for using an optical signal to actively tune an optical interferometer by dithering the wavelength of the input light so as to create the same optical feedback signals for tuning the optical interferometer as used in the prior art without introducing dither to the optical path length of the leg of the optical interferometer. The apparatus comprises means for generating a dithering signal, means for applying a portion of said dithering signal to the optical signal so as to provide an optical signal having a varying wavelength in accordance with said dithering signal, an optical interferometer having one optical path length that is electronically tunable, photodetector means on each of the two optical interferometer outputs for developing an electronic feedback signal that includes a portion representative of the dithering signal, means for synchronously extracting the dithering signal from the electronic signal, and means responsive to the extracted dithering signal and responsive to appropriately electronically tune the optical path length in the interferometer. More particularly, the optical interferometer is responsive to the optical signal having a varying wavelength in the same way that the optical interferometer is responsive to an optical path length dithering adjustment using the known prior art in that the optical interferometer is operative to develop a first interference pattern where the optical path length or wavelength is a prescribed value and is operative to develop a different interference pattern when the optical path length or wavelength is changed. Also, the photodetector means is responsive to the optical interference pattern and is operative to develop the electronic feedback signal when the first interference pattern is not present.

In another aspect, the present invention provides a method of using an optical signal for tuning an optical interferometer by adjusting the optical path length of one of its optical paths to produce a preselected interference pattern, comprising the steps of generating a dithering signal, applying a portion of the dithering signal to the optical signal to vary its wavelength, applying the varying wavelength optical signal to the optical interferometer so as to change the interference pattern it produces, developing an electronic signal representative of the changed interference pattern, applying a portion of the dithering signal and the electronic signal to a synchronous detector to create a drive signal, and applying the drive signal to the one optical path in a manner to adjust its optical path length such that is the preselected interference pattern is formed, thereby tuning the optical interferometer.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
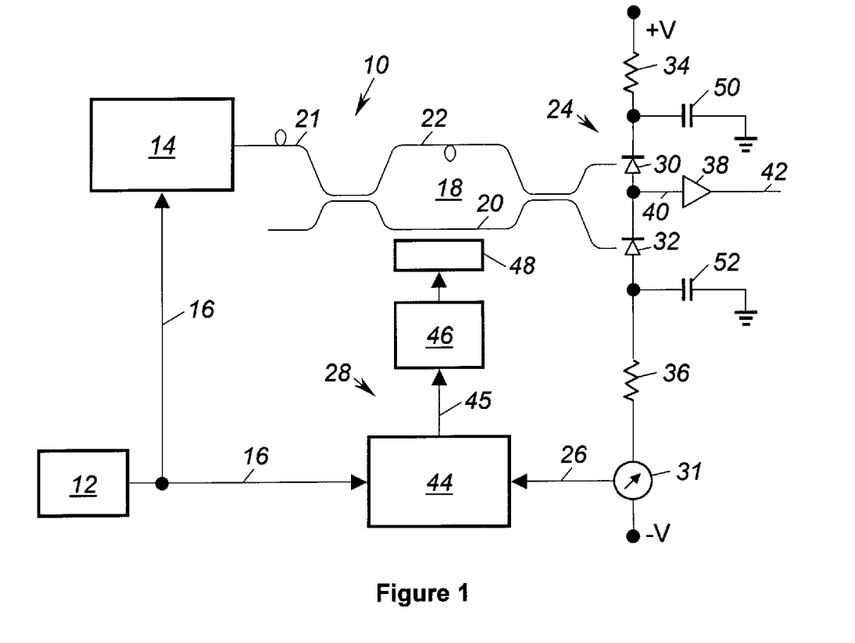
FIG. 1 is a block diagram of the apparatus for tuning an optical interferometer in accordance with the present invention.

As illustrated in the block diagram of FIG. 1, the present invention provides an apparatus using an optical signal for tuning an optical interferometer, generally designated by the numeral 10. Briefly, apparatus 10 employs means for generating the optical signal 14 and includes means for generating an electronic dithering signal 12, means 16 for applying a portion of the electronic dithering signal to the optical signal so as to provide an optical signal having a varying wavelength in accordance with the electronic dithering signal, and an optical interferometer 18 having one leg 20 with an optical path length that can be electronically tuned. The optical interferometer 18 is responsive to the optical signal on path 21 having a varying wavelength and an optical path length electronic drive adjustment signal and is operative to develop a first interference pattern when the optical path length leg 20 is electronically tuned to a prescribed value corresponding to a particular electronic drive adjustment signal and is operative to develop a different interference pattern when the optical path length leg 20 is changed from the prescribed value and when the electronic drive adjustment signal is changed from the prescribed value. The apparatus 10 also includes an optoelectronic receiver (generally designated by the numeral 24) which includes two photodetectors 30 and 32, one at each output of the optical interferometer 18, which are responsive to the intensity of the optical interference pattern. The optoelectronic receiver 24 develops an electronic feedback signal delivered by means 26 when the different interference pattern is present, or in other words when the first interference pattern is not present. It also includes means 28 responsive to a portion of the dithering signal conveyed by means 16 and the electronic feedback signal conveyed by means 26 that is generated by a current meter 31 from the induced photocurrent in photodetector 32 and which is operative to produce the optical path length electronic drive adjustment signal conveyed by means 45. The electronic drive adjustment signal conveyed by means 45 is created by a synchronous detection lock-in amplifier 44 that generates a tuning voltage that reflects the dithering signal content in the electronic feedback signal conveyed by means 26. The optical path length electronic drive adjustment signal conveyed by means 45 serves to change the optical path length of the leg 20 until it reaches the prescribed value by providing the tuning signal to the electronic optical path length controller 46 which drives the optical path length tuning element means 48. As will be described subsequently, this produces the first interference pattern and thus tunes the optical interferometer.

In this patent the phrase "optical path length" is characterized and mathematically defined as the product of the physical propagation distance and the associated refractive index of the medium through which the light propagates. It should be recognized that adjusting the optical path length can be accomplished by adjusting the physical propagation distance or adjusting the index of refraction of the medium through which the light propagates in the interferometer. The physical propagation distance can be adjusted by stretching a fiber with a piezoelectric transducer, thermally expanding the length with heat, or positioning a mirror within the interferometer via a piezoelectric piston. Adjusting the index of refraction could be accomplished by heating the medium or by an electro optic affect created via an applied electric field. In the preferred embodiment, the optical path length is changed by applying heat to thermally expand the segment of silica optical waveguide comprising leg 20 of the optical interferometer. Thermal heating can be used to perform the optical path length tuning in this invention despite the relatively long thermal time constants associated with this approach because only slow tuning adjustments are needed and dithering of the optical path is not required.

The optical interferometer 18 contains two separate optical legs or paths 20 and 22, leg 20 being the adjustable path. Optical interferometer 18 is preferably a Mach-Zehnder interferometer made of silica waveguide material as is commercially available from Photonic Integration Research, Inc., Columbus Ohio as model FDM-10G-1.5-M-PM and includes an integrated thermal heater 48 to enable tuning of optical leg 20. However, the apparatus and method of this invention can utilize many other types of optical interferometers including a Michelson interferometer, a Sagnac interferometer, or even a Fabry-Perot interferometer. These interferometers can be made using many materials including optical fiber, free space, or silica waveguide. The optical interferometer splits light into two separate optical paths and then recombines this light interferometrically to create optical outputs that can present constructive and destructive interference. The wavelength of light and the relative optical path lengths of the two legs in the interferometer determine the particular state of interference that takes place when the light is combined. This state of interference determines if the output presents constructive interference, in which case there is an optical intensity output, or destructive interference, in which case there is an absence of optical intensity output. When one of the two optical path lengths within the interferometer is made to be adjustable, the state of interference can be continuously varied between the constructive and destructive interference states as long as the wavelength is held constant. This enables the optical interferometer to be set to a particular state for a given wavelength of light. If the wavelength is changed, the state of interference can be maintained by appropriately tuning the relative optical path lengths of the interferometer, otherwise the state of interference will change.

This invention utilizes this last particular optical interference case where the optical path lengths are not changed when the wavelength is changed. Starting with an interference state where constructive interference occurs at one output port and destructive interference occurs at the other output port of the interferometer, this invention uses a slight change in the wavelength of optical source 14, in this case by the dithering signal applied by means 16, where there is no immediate adjustment made to the optical path lengths in interferometer 18 within a time scale on the order of the dithering signal frequency. In the destructive interference output, taken as being directed to photodetector 32 for this example, this slight wavelength change causes an increase in optical intensity every time the wavelength is pulled slightly from the preselected interference pattern state. In the course of one sinusoidal dithering signal swing, the wavelength is slightly too short for half the cycle and slightly too long for the other half of the cycle. This leads to two cycles of increased intensity in the optical intensity of the destructive interference output directed to photodetector 32 for every complete cycle of dithering signal. Since the photodetectors respond to optical intensity, the electronic feedback signal generated by the photocurrent in photodetector 32 will correspond to a signal that varies with twice the frequency of the dithering signal. Thus the electronic feedback signal conveyed by means 26 to the synchronous detection lock-in amplifier 44 comprises the second harmonic of the dithering frequency, that is a signal that has twice the frequency of the dithering signal frequency. The synchronous lock-in amplifier 44 only amplifies signals that have the same frequency as the frequency conveyed to it by means 16, in this case the dithering signal frequency. Thus, the second harmonic contribution is not amplified by the amplifier. This is the normal properly tuned preselected interference state for the optical interferometer, and under these conditions there is no electronic drive adjustment signal conveyed from means 45 to cause a correction in the tuning of the optical interferometer.

When the state of optical interference within the interferometer 18 drifts, from temperature effects for example, the photodetector 32 at the destructive optical output no longer detects zero optical intensity when the wavelength is at the middle of its dithering signal swing. This causes the slight wavelength variation stemming from the dithering signal to no longer pull the wavelength both long and short of the proper condition to achieve destructive interference. The wavelength in this case is then only being pulled either primarily longer or primarily shorter than the condition required for destructive interference. Thus, during a dithering signal cycle, the optical intensity merely increases or decreases according to the cycle swing of the dithering signal. The resulting dither frequency in the electronic feedback signal is a dithering signal that has the same frequency as the original dither signal frequency. This electronic feedback dither signal is amplified by the synchronous detection lock-in amplifier 44, and an optical path length electronic drive adjustment signal is conveyed to the tuning controller of the optical interferometer. This electronic drive adjustment signal causes a tuning correction to bring the optical interferometer back to the preselected interference state where the electronic feedback signal has no fundamental dithering signal frequency component.

It can be further seen that when the interferometer is in the slightly out-of-tune state and the dithering signal is pulling the wavelength either primarily longer or shorter of the preselected interference state, the resulting intensity variation in the destructive output of the interferometer will follow the dithering frequency, but can be 180 degrees out-of-phase with the original dithering frequency. In this example, if the optical interferometer has drifted so that when the wavelength is pulled longer by the dithering signal at its maximum swing and there is a corresponding increase in optical intensity at the destructive output, then the electronic feedback signal generated by photodetector 32 will also reflect an increase that will be in phase with the original dithering signal. However, if the optical interferometer has drifted so that this pull to a longer wavelength by the dithering signal at its maximum swing results in a decrease in the optical intensity at the destructive output (which is the case when the wavelength is being dithered at values that are shorter than the wavelength needed to achieve the preselected interference state), then the electronic feedback signal generated by photodetector 32 will decrease in a 180 degree out-of-phase relation to the original dithering signal. In this way, the particular phase of the fundamental contribution of the dithering signal in the electronic feedback signal indicates in which direction the optical interferometer has drifted.

When the phrase first or preselected interference pattern or state is used, it corresponds to the result when the optical interferometer is properly tuned for use as a demodulator in a DPSK communication system and refers to the optical interference state where complete constructive interference takes place in one output port and complete destructive interference takes place in the other output port. When the state of interference is dithered about this first or preselected interference state, as is the case when the input light has a dithering wavelength that varies about the wavelength that establishes the first or preselected interference state, the output intensity delivered from each port of the interferometer will vary with only the second harmonic of the dithering frequency, which is at twice the dithering frequency. This optical intensity variation is detected by the photodetectors, and thus the delivery of an electronic feedback signal generated by photodetector 32 that contains only the second harmonic of the dithering frequency and an absence of the fundamental dithering frequency is also to be associated with the first or preselected interference state.

Also, when the phrase out-of-tune second or different interference pattern or state is used, it refers to an interference state of the optical interferometer where there is incomplete constructive interference in one output port and incomplete destructive interference in the other output port.

This is an interference state that will lead to degraded performance when used to demodulate the optical signal in a DPSK optical communication system, and thus corresponds to a situation where the optical interferometer is not properly tuned, e.g. the out-of-tune state. When the input wavelength is dithered about a wavelength value that interferes with this second or different interference state, the output intensity in each optical output port will vary with a reduced second harmonic contribution and there will be an introduction of the fundamental dithering frequency in this intensity variation. Thus any condition that generates the presence in the electronic feedback signal of both the fundamental dithering frequency and the second harmonic of this dithering frequency is also to be associated with the out-of-tune second or different interference state.

It should be recognized that there is a continuum of out-of-tune second or different interference patterns where the intensity variation from each output port includes both the fundamental dithering frequency and the second harmonic. The fundamental frequency contribution in this continuum ranges from nearly zero contribution to being the only signal in the intensity variation when the interferometer is tuned to a state farthest from the first or preselected interference state. The second harmonic contribution of the dithering frequency ranges from being the dominant contribution to being completely absent. In addition, there is another important aspect to the fundamental frequency contribution that is to be associated with this out-of-tune second interference state. This is that the phase of the fundamental frequency appears either in phase or 180 degrees shifted in phase from the original dithering frequency depending on the direction that the optical interferometer is out-of-tune from the preselected interference state. The direction of tuning indicates whether an increase or decrease is needed to correctly tune the optical path length of the interferometer. Thus, by detecting the phase and amplitude of the contribution of the fundamental frequency in the electronic feedback signal, it is possible to determine the direction and degree of tuning correction needed to return the optical interferometer to the preselected interference state.

Referring still to FIG. 1, the dithering signal generator provided by means 12 is a common audio frequency electronic sine wave generator that is capable of providing an electronic dithering signal to both the wavelength dithering optical source 14 and the synchronous detection lock-in amplifier 44 simultaneously. By providing the same dithering signal to the optical source and the synchronous detection means, it is possible to detect both the amplitude and the phase of a very small amplitude dithering signal in the presence of many other stronger signals. It is not necessary that the dithering signal generator means 12 introduce a second harmonic contribution in the dithering signal because the second harmonic contribution in the output of the optical interferometer is created by the photodetector's response to the optical intensity. The optical intensity is related to the interfering optical electric fields produced by the optical interferometer via a squared nonlinear process that gives rise to the creation of a second harmonic contribution in the optical intensity.

There are a number of means for generating an optical signal that provides a varying wavelength in accordance with the dithering signal. It may be generated by a commercially available tunable optical source, as well as by the sources shown and subsequently described with reference to FIGS. 2 and 3. In the case of the commercially available tunable optical source, a tilting grating is used to provide a wavelength tunable external optical cavity for a semiconductor laser diode that forces the laser to operate on a specific wavelength selected by the particular tilt angle of the grating. By applying the dithering signal to the motor positioner that tilts the grating, the grating can be made to mechanically vibrate at the required audio frequency. This vibration causes the grating to tilt over a small range of tilt angles. This provides an optical source with a varying wavelength in accordance with the dithering signal and can be the wavelength tunable laser diode source, sold commercially as model TUNICS-PRI by Photonectics of France.

Figure 3:
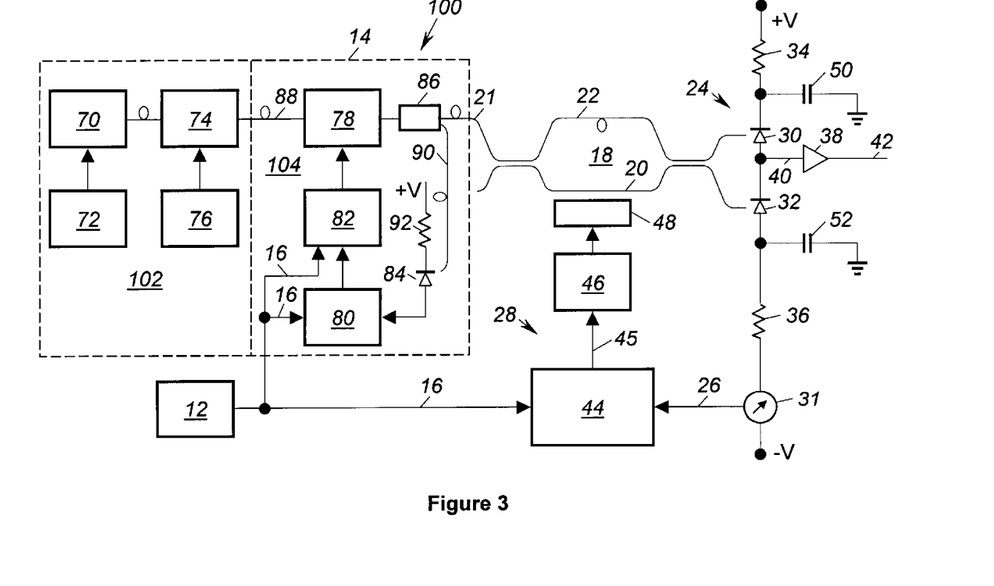
FIG. 3 is a block diagram of an alternative embodiment of the apparatus for tuning an optical interferometer in accordance with the present invention.

The means 24 only needs to develop an audio frequency signal for feedback purposes. Thus this signal can be extracted from the low frequency currents generated by the photodetectors without compromise to their high frequency performance. In FIG. 1, the high frequency currents that are associated with high speed DPSK modulated data pass through capacitors 50 and 52 to ground and flow in a complementary fashion to enhance noise rejection. (The DPSK modulator for a data communication system is shown in FIG. 3). Resistors 34 and 36 help to direct the high frequency currents to the by-pass capacitors 50 and 52 by serving as high impedance isolators to prevent high speed currents from trying to drive the bias lines +V and −V. The photocurrents flowing through conductor 40, drive the high speed transimpedance amplifier 38 that delivers an electronic data signal via its output 42. Accordingly, the photocurrents do not have to pass through the circuitry that is used to bias the photodiodes or extract the electronic feedback signal used to tune the optical interferometer. The output signal at 42 is a high speed electronic data output. It is significant that the apparatus 10 is completely compatible in providing support to deliver a high speed data output for use in an optical communication system. The audio frequency signal can be extracted from only one of the two optical outputs of the optical interferometer, and thus the current signal can be derived from just photodetector 32 as is shown in FIG. 1. A current meter 31 is placed in the reverse bias path of photodetector 32 on the isolated side of resistor 36 to detect the presence of low frequency photocurrents drawn by photodetector 32 arising from the response of the optical interferometer to the dithering wavelength signal. The electronic feedback signal created by current meter 31 is conveyed to the synchronous detection lock-in amplifier by conductor 26.

The photodetectors are not required to be capable of high speed operation but for optical communication applications this capability is desirable. The entire optoelectronic receiver 24 can be a commercially sold balanced optoelectronic receiver made by New Focus, Inc. of Santa Clara, Calif. and designated as models 1607 and 1617. Alternatively, it is not required that the two photodetectors be tied together in the balanced configuration shown in FIG. 1, but instead can be used to drive separate inputs to a dual input differential transimpedance amplifier and have the same polarity orientation (not shown). The current meter 31 and conveying means 26 for the electronic feedback signal can be placed in the reverse bias path of one photodetector used in this configuration and enable the application of this invention. Thus a high speed differential optoelectronic receiver of the type described in pending patent application Ser. No. 09/206,912, filed Dec. 7, 1998, by the assignee of the present patent can be used.

The synchronous detection lock-in amplifiers 44 is available commercially from several manufacturers, such as Stanford Research Systems, Inc. in Sunnyvale Calif. These instruments synchronously detect a small electronic signal, complete with phase detection, by using a reference signal having the same frequency and deliver a steady state output voltage with a value corresponding to the amplitude swing of the detected signal and a voltage polarity that reflects the phase of the detected signal in relation to the original reference signal. The output voltage delivered by these commercial instruments is directly suitable for the electronic drive adjustment signal conveyed for conductor 45. This electronic drive adjustment voltage can be considered to be an error signal that indicates how far out-of-tune the optical interferometer is and the direction in which this error correction should be applied to return the optical interferometer to the preselected interference state.

The electronic optical path controller 46 is a buffer amplifier that translates the electronic drive adjustment signal to the appropriate drive signal necessary to electronically tune the optical path length of leg 20. In the embodiment where the optical interferometer 18 comprises a silica waveguide with an integrated heater, the voltage signal is converted to a current so that a resistive heater element 48 can be driven. In the embodiment where the optical interferometer uses an optical fiber and a PZT to stretch the fiber, the voltage would need to be amplified to provide the necessary potential to drive the PZT and create the necessary optical path length change to tune the optical interferometer.

It should be recognized that the optical interferometer automatically seeks the preselected interference state. In operation the process involves generating a dithering signal and applying a portion of the dithering signal to an optical signal to vary its wavelength. Then the varying wavelength optical signal is applied to the optical interferometer 18 so as to introduce intensity variations in the interference pattern that reflect the particular state of interference which the interferometer is at initially. The varying intensity present in the interference output caused by the wavelength dither is detected by the photodetectors in the optoelectronic receiver 24 to generate an electronic feedback signal representative of the interference state of the optical interferometer. This electronic feedback signal is synchronously detected to determine the amount of tuning correction and direction required to bring the interferometer into the preselected interference state, and this correction is delivered by generating the electronic drive adjustment signal. In other words an appropriate error correction, in terms of magnitude and proper direction, is autonomously assessed by appropriate detection and delivered to the optical interferometer by the creation of an appropriate electronic drive adjustment signal. The electronic drive adjustment signal is applied to the electronic optical path controller 46 and appropriately tunes the optical interferometer to the preselected interference state. Once the preselected interference state is achieved, only corrections to accommodate drift are generated and thus this preselected interference state is maintained.

Figure 2:
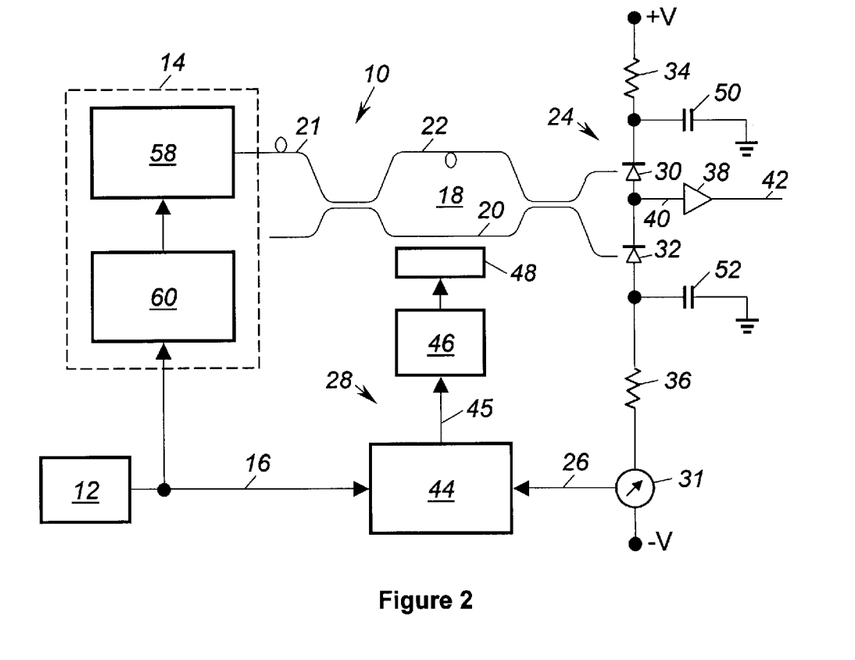
FIG. 2 is a block diagram of the preferred embodiment of the apparatus for tuning an optical interferometer in accordance with the present invention.

Referring now to FIG. 2, a more detailed embodiment of the apparatus 10 is illustrated. Many of the parts of the apparatus 10 are identical in construction to like parts in the apparatus illustrated in FIG. 1 described above, and accordingly, there have been applied to each part of the apparatus in FIG. 2 a reference numeral corresponding to the reference numeral that was applied to the like part of the apparatus described above and shown in FIG. 1.

The fundamental difference between the apparatus 10 of FIGS. 1 and 2 is that the means for generating an optical signal 14 comprises a laser diode 58 and a current supply 60. The current supply 60 receives the dithering signal generated by the dither generator 12 and conveyed via conductor 16. The current supply 60 provides a current to drive the laser diode 58 with a small additional modulation that varies in accordance with the dithering signal. Because the wavelength of a laser diode depends upon both the temperature, which is generated by resistive heating stemming from the drive current, and the carrier density within the lasing junction, which is directly from the drive current, the wavelength of a laser diode is a very sensitive function of the level of the drive current. Thus, the small modulation in the drive current from the addition of the dithering signal causes the wavelength of laser diode 58 to vary in accordance with the dithering signal. This provides the required optical source means 14 that must deliver an optical signal which has a dithering wavelength that varies in accordance with the dithering signal. The remainder of apparatus 10 in FIG. 2 operates identically to the operation described for FIG. 1.

Because laser diodes can be modulated at much higher frequencies than a grating can be made to vibrate, this approach to dithering the wavelength enables much higher dithering frequencies to be used. Application in this higher frequency range will require the use of a dither generator 12, that is capable of generating frequencies that are greater than audio frequencies. In fact, the embodiment shown in FIG. 2 can be made to operate at frequencies that are orders of magnitude higher than the dithering frequencies available using the known prior art. This can be an advantage in some applications where the dither frequency needs to be moved well above the frequencies of the signals of interest so as not to introduce adverse noise. In general, it is much easier to filter and remove noise sources that are higher in frequency than the frequencies of the desired signals. Thus this higher dithering frequency can be more easily removed from the optical signal delivered at the output of the transimpedance amplifier 38 in a sensitive low frequency application requiring active optical interferometer tuning.

It should be recognized that this invention is applicable to tuning an optical interferometer that is used with light that has a limited degree of coherence. All that is required is that the optical path difference of the interferometer not exceed the coherence length of the light used. In the case of the optical communication system in the referenced article where the light was modulated using DPSK modulation at a digital data rate of 10 Gbps, the modulation broadened the light to a spectral spread of roughly 0.2 nanometers and shortened the coherence length of the light. The Mach-Zehnder interferometer used in this DPSK communication application has an optical path length difference that is equal to the propagation delay of one data bit, or roughly 2 centimeters in silica optical waveguide. Thus, the limited coherence length of this light is not exceeded by the optical path length difference of this Mach-Zehnder optical interferometer.

With reference now to FIG. 3, there is illustrated another embodiment of an apparatus for tuning an optical interferometer 100 made in accordance with the present invention. This is the preferred embodiment for application to DPSK optical communication. Many of the parts of the apparatus 100 are identical in construction to like parts of the apparatus 10 illustrated in FIG. 1, and accordingly, there has been applied to each part of the apparatus 100 a reference numeral corresponding to the reference numeral that was applied to the like part of the apparatus described above.

The fundamental differences between the apparatus described above and the apparatus illustrated in FIG. 3 is in the construction of the means 14 for generating an optical signal. In particular, this embodiment enables the means providing for the optical source and introducing the high speed DPSK modulation to be remotely located, with only an optical interface, from the means for varying the wavelength and tuning the optical interferometer. By not requiring the means for conveying the dithering signal 16 to be delivered to the optical source, as was the case in the earlier embodiment, this embodiment is well suited to many different types of optical communication applications. As shown, the means 14 comprises a laser diode 70 that produces an optical signal characterized by a predetermined wave length having a supply current source 72 that produces a steady state current supply to the laser diode. A phase modulator 74 of the ten gigahertz (GHz) type modulates the optical output from the laser diode in accordance with the data generated by a wide band 10 Gbps digital data generator 76. This modulator can be a straight phase modulator or a Mach-Zehnder modulator biased at the null to produce a 180 degree DPSK optical data signal. The wavelength of the optical signal, originally very narrow as initially delivered by the laser diode 70, is now broadened to nearly 0.2 nanometers by the high speed DPSK data modulation. This light constitutes the transmitted light of the optical communication system and the means for its generation can be remotely located away from the remainder of means 14.

The light is then passed through an electronically tunable narrow pass band optical filter 78 that has a pass band transmission on the order of the broadened spectral width of the DPSK modulated light, or in terms of optical frequencies around 25 GHz. A portion of the dithering signal from dither frequency generator 12 is sent to the electronic optical filter controller 82 via conductor 16, which in turn modulates the tunable optical filter 78 and causes the center wavelength of the optical filter pass band to vary in accordance with the dither signal. This causes the light broadened by the DPSK high data rate modulation to become filtered so as to present a central wavelength that follows the wavelength variation in accordance with the dither signal. Thus this light delivers the required characteristics needed from the optical source for this invention, namely a wavelength variation in accordance with the dither signal. The remainder of the embodiment for this invention as presented in FIG. 1 can be applied to this light as is indicated in FIG. 3.

In order to maintain the narrow optical pass band at a central wavelength that matches the central wavelength of the broaden DPSK modulated light, it is necessary to tune the Mach-Zehnder interferometer 18 in a manner as previously described. In this application, the wavelength variation of the pass band of the optical filter creates an intensity variation of the output light that has exactly the same characteristics as the intensity variation created by the dithering signal in the output interference of the Mach-Zehnder interferometer. When the pass band is centered on the center of the broadened light spectrum, only the second harmonic of the dithering frequency will be present. Offsets in wavelength in either direction will introduce the fundamental component of this dithering frequency into the intensity variation complete with the change in phase depending on which side of the central wavelength the offset occurs. This allows a portion of the wavelength dithering light to be split from the output of the tunable optical 78 filter by an optical splitter 86 onto optical path 90 so that the intensity can be detected by photodetector 84. The photodetector 84 is reverse biased by potential +V via resistor 92. The electrical signal created by photodetector 84 is then conveyed to a synchronous detection lock-in amplifier 80 that uses the reference dither signal to create the appropriate tuning signal to allow the tunable filter controller 82 to correct any offsets in the central wavelength. In this way, the tunable narrow pass band optical filter 78 is actively tuned to dither the wavelength about the central wavelength of the broadened DPSK modulated light.

In the embodiment for DPSK optical communication shown in FIG. 3, the tunable narrow band optical filter 78 is preferably an optical Fabry-Perot filter with a pass band of 25 GHz for a data modulation rate of 10 Gbps. The tuning element of the Fabry-Perot filter is preferably a piezoelectric transducer. The type of narrow pass band optical filter is not critical to the application to this invention, and thus many types of electronically tunable optical filters can be used including the Fabry-Perot filters made by Micron Optics, Inc. or Queensgate Ltd, or the frequency division multiplexer filters that utilize a Mach-Zehnder interferometer and a thermal tuning element made by Photonic Integration Research, Inc.

It is significant that a portion 102 of the means 14 shown in FIG. 3 does not require that the dithering signal be applied to it. The portion 102 comprises only the laser source 70, the current supply 72, the phase modulator 74, and the wide band data generator 76 and can thus be remotely located with the optical communication transmitter. The remaining portion 104 is able to be located with the optical communication receiver where the dither generator 12 resides and the conductors 16 enable the dither signal to be conveyed to both the wavelength dithering portion 104 and the active electronics means 28 that performs the tuning of the optical interferometer. This portion 104 includes the tunable narrow pass band optical filter 78, the synchronous detection lock-in amplifier 80, the tunable filter controller 82, the photodetector 84, and the optical splitter 86. The means for the optical connection 88 between these two portions of means 14 provides the optical link between the optical transmitter and the optical receiver. This optical connection means 88 can be expanded to accommodate a great distance including means for additional optical amplification, as is described in the referenced article, and can be comprised of optical fiber, free-space, or any other optical propagation medium utilized by the optical communication system.

It should also be noted that the tunable narrow pass band filter 78 used in the embodiment presented in FIG. 3 can still perform the critical optical communication function of removing the out-of-band ASE noise generated by doped fiber optical amplifiers. As discussed in the referenced article, the use of doped fiber optical amplifiers is necessary in some communication applications to boost the sensitivity of the optical receiver. The dither signal introduced by the tunable Fabry-Perot filter utilized in the optical communication system presented in this article was already accepted as an unavoidable source of noise impairing, to some degree, the ability to recover the DPSK modulated information. The fact that the present invention utilizes this unavoidable source of dither noise to perform both active tuning of the tunable pass band optical filter and the active tuning of the optical interferometer without introducing any additional dither noise from dithering the optical interferometer is a significant advantage. In this way, the present invention completely eliminates the dither noise that would be imparted to the optical communication signal by the dither of the optical interferometer leg. In addition, this invention enables the utilization of a higher dither frequency than that which can be used to directly dither a tunable silica waveguide optical interferometer with a slow thermal heater as was done in the prior art. By utilizing a fast piezoelectric transducer to create the dither, the higher frequency dither can be more easily electronically detected and thus utilize a smaller amplitude that reduces the level of injected noise.

Figure 4:
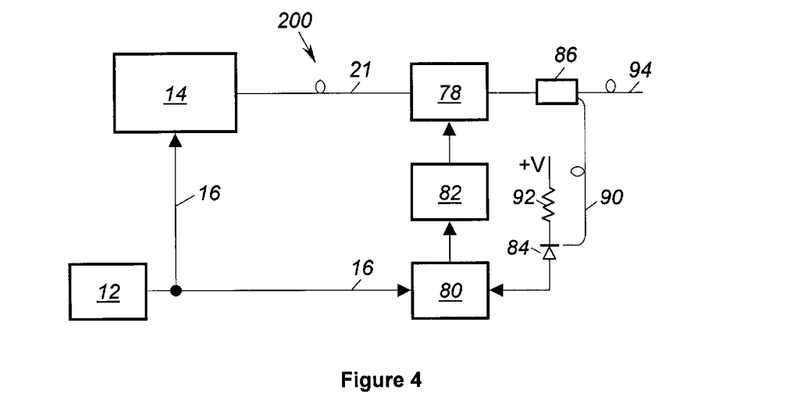
FIG. 4 is a block diagram of yet another embodiment of the apparatus for tuning an optical interferometer in accordance with the present invention.

With reference now to FIG. 4, there is illustrated still another embodiment of an apparatus for tuning an optical interferometer 200 made in accordance with the present invention. In this embodiment the invention is used to tune a narrow pass band Fabry-Perot interference filter instead of a Mach-Zehnder interferometer. In addition, the system output can be an optical signal in contrast to the electrical communication signal output of the optoelectronic receiver discussed in the other embodiments. Many of the parts of the apparatus 200 are identical in construction to like parts of the apparatus illustrated in FIGS. 1 and 3, and accordingly, there has been applied to each part of the apparatus 200 a reference numeral corresponding to the reference numeral that was applied to the like part of the apparatus described above.

In FIG. 4, the light output of optical source 14 has a varying wavelength in accordance with the dithering signal that is applied by conductor 16 from the dither signal generator 12. The wavelength-dithering light is conveyed by an optical fiber 21 to a tunable narrow pass band Fabry-Perot interference filter 78 which is the optical interferometer to be tuned. It replaces the Mach-Zehnder interferometer described in the previous embodiments. This interferometer effectively has only one output 94 corresponding to the optical transmission through it; however, there is a second complementary output delivered as the reflection along the path 21 in a direction towards the means 14. The narrow pass band Fabry-Perot interference filter is comprised of two parallel mirrors that bounce the light many times within a cavity established by the two mirrors. The central wavelength passed by the Fabry-Perot interference filter is tuned by adjusting the optical path length of this cavity formed by the two mirrors. Tuning is performed using a PZT to position the spacing of mirrors relative to each other. The PZT within the Fabry-Perot interference filter 78 is controlled by an electronic filter controller 82 that buffers a drive voltage to the appropriate level to operate the PZT positioner. The electronic filter controller receives an input signal from only the synchronous detection lock-in amplifier 80. Hence, the optical path length of the Fabry-Perot interference filter is not dithered.

The tunable interference filter operates on the wavelength varying light and delivers an optical output to optical splitter 86. A portion of this light is conveyed by the optical filter 90 to photodetector 84 which is reversed biased by the resistor 92 and the applied potential +V. The electronic signal generated by photodiode 84 will have all the same dither frequency characteristics when the wavelength of the optical source is dithered as was previously described with reference to FIG. 3 where the central pass band wavelength of the tunable filter was dithered. When the pass band of the tunable interference filter 78 is adjusted to the central wavelength of the dither, only the second harmonic component of the dither frequency will be present in the intensity variations sensed by the photodector 84. Thus the signal generated by photodetector 84 will only contain the second harmonic component of the dither frequency when the filter is correctly tuned. If the pass band of the tunable interference filter 78 is not correctly tuned, the signal generated by photodetector 84 will contain a fundamental dither frequency contribution, complete with an amplitude indicating the degree of tuning error and a phase reflecting the needed direction for correction. The synchronous detection lock-in amplifier 80 extracts this information from the electronic signal and applies the proper tuning correction to the electronic filter controller 82 to tune the pass band of the tunable interference filter 78 to coincide with the central wavelength of the dither.

At this correct filter tuning state, the optical output delivered at 94 will be correctly filtered so that all the out-of-band light is removed by the tuned interference filter. The out-of-band light is effectively reflected at the input of the filter. Accordingly, the tunable narrow pass band Fabry-Perot interference filter 78 is correctly tuned with the dithering wavelength source 14.

Accordingly an apparatus and the method for tuning the optical interferometer is provided. In this apparatus, the optical path length is tuned so as to continuously maintain a constant state of interference from a slowly changing wavelength source. The actual adjustment of the relative optical path lengths is maintained even under more difficult and uncontrollable conditions, such as temperature changes.

Obviously, many modifications and variations of the present invention are possible in view of the above teachings. Thus, it is to be understood that, within the scope of the appended claims, the invention may be practiced otherwise than as specifically described above.

What is claimed is:

1. An apparatus using an optical signal for tuning an optical interferometer comprising:

means for generating a dithering signal;

means applying portion of said dithering signal to the optical signal so as to provide an optical signal having a varying wavelength;

an optical interferometer having an optical path length that is tunable, said optical interferometer being responsive to the optical signal having a varying wavelength and a path length adjustment drive signal and being operative to develop a first interference pattern when said optical path length is a prescribed value and being operative to develop a second interference pattern when said optical path length is changed;

means responsive to the optical interference pattern and being operative to develop an electronic feedback signal when said first interference pattern is not present; and means responsive to a portion of said dithering signal and said electronic feedback signal and operative to produce said optical path length adjustment drive signal, said optical path length adjustment drive signal serving to change the optical path length until it reaches said prescribed value, thereby producing said first interference pattern and tuning said optical interferometer.

2. The apparatus as set forth in claim 1, wherein the means responsive to a portion of said dithering signal and said electronic feedback signal comprises a synchronous detection lock-in amplifier means and a heater, said amplifier means serving to produce said optical path length adjustment signal and said heater serving to change the temperature of, and hence adjust the optical path length.

3. The apparatus as set forth in claim 2, wherein said optical interferometer is of the Mach-Zehnder type.

4. The apparatus as set forth in claim 3, wherein said means responsive to the optical signal pattern is a dual detector.

5. The apparatus as set forth in claim 3, wherein said optical interferometer is made from silica waveguide material.

6. The apparatus as set forth in claim 1, wherein said means applying a portion of said dithering signal to the optical signal comprises a synchronous detection lock-in amplifier, a tunable optical filter and controller for tuning the optical filter such that the center wavelength of the optical filter pass band varies in accordance with the dithering signal.

7. The apparatus as set forth in claim 6, wherein said tunable optical filter is a Fabry-Perot optical filter.

8. The apparatus as set forth in claim 1, wherein the optical interferometer is a Fabry-Perot interference filter.

9. The apparatus as set forth in claim 1, wherein said means responsive to a portion of said dithering signal and said electronic feedback signal comprises synchronous detection lock-in amplifier means for developing said optical path length adjustment signal and a piezoelectric transducer that serves to adjust the optical path length in response to said optical path length adjustment signal.

10. A method of using an optical signal for tuning an optical interferometer by adjusting its optical path length to produce a preselected interference pattern, comprising the steps of:

generating a dithering signal;

applying a portion of the dithering signal to the optical signal to vary its wavelength;

applying the varying wavelength optical signal to the optical interferometer so as to change the interference pattern it produces;

developing an electronic signal representative of the changed interference pattern;

developing a drive signal from a portion of the dithering signal and the electronic signal; and applying the drive signal in a manner to adjust the optical path length such that the preselected interference pattern is formed, thereby tuning the optical interferometer.

11. The method as set forth in claim 10, wherein a Fabry-Perot filter serves to apply a portion of the dithering signal to the optical signal to vary its wavelength.

12. In an optical communication receiver that receives an optical signal, method of continuously for tuning its optical interferometer by adjusting its optical path length to produce a preselected interference pattern, comprising the steps of:

generating a dithering signal;

applying a portion of the dithering signal to the received optical signal to vary its wavelength;

applying the varying wavelength optical signal to the optical interferometer so as to change the interference pattern it produces;

developing an electronic signal representative of the changed interference pattern;

developing a drive signal from a portion of the dithering signal and the electronic signal; and applying the drive signal in a manner to tune the optical path length such that the preselected interference pattern is formed, thereby tuning the is optical interferometer.

13. An optical communication receiver for receiving an optical signal comprising:

means for generating a dithering signal;

means applying a portion of said dithering signal to the received optical signal so as to provide an optical signal having a varying wavelength;

an optical interferometer having an optical path length that is tunable, said optical interferometer being responsive to the optical signal having a varying wavelength and a path length adjustment drive signal and being operative to develop a first interference pattern when said optical path length is a prescribed value and being operative to develop a second interference pattern when said optical path length is charged;

means responsive to the optical interference pattern and being operative to develop an electronic feedback signal when said first interference pattern is not present; and means responsive to a portion of said dithering signal and said electronic feedback signal and operative to produce said optical path length adjustment drive signal, said optical path length adjustment drive signal serving to change the optical path length until it reaches said prescribed value, thereby producing said first interference pattern.

14. An optical communication system comprising:

an optical signal generator; and an optical receiver comprising means for generating a dithering signal;

means applying a portion of said dithering signal to a received optical signal so as to provide an optical signal having a varying wavelength;

an optical interferometer having an optical path length that is tunable, said optical interferometer being responsive to the optical signal having a varying wavelength and a path length adjustment drive signal and being operative to develop a first interference pattern when said optical path length is a prescribed value and being operative to develop a second interference pattern when said optical path length is changed;

means responsive to the optical interference pattern and being operative to develop an electronic feedback signal when said first interference pattern is not present; and means responsive to a portion of said dithering signal and said electronic feedback signal and operative to produce said optical path length adjustment drive signal, said optical path length adjustment drive signal serving to change the optical path length until it reaches said prescribed value, thereby producing said first interference pattern.

* * * * *